United States Patent [19]

Ayers et al.

[11] Patent Number: 5,857,105
[45] Date of Patent: Jan. 5, 1999

[54] COMPILER FOR REDUCING NUMBER OF INDIRECT CALLS IN AN EXECUTABLE CODE

[75] Inventors: Andrew E. Ayers, Amherst; Chun C. Gong, Nashua, both of N.H.

[73] Assignee: Hewlett-Packard Company, Palo Alto, Calif.

[21] Appl. No.: 796,095

[22] Filed: Feb. 5, 1997

[51] Int. Cl.$^6$ .................................................. G06F 9/45
[52] U.S. Cl. ......................... 395/708; 395/705; 395/709
[58] Field of Search .................................. 395/585, 586, 395/704, 705, 707, 708, 709, 680, 684

[56] References Cited

U.S. PATENT DOCUMENTS

| 5,175,856 | 12/1992 | Van Dyke et al. | 395/700 |
| 5,721,893 | 2/1998 | Holler et al. | 395/586 |
| 5,740,493 | 4/1998 | Carini | 395/705 |

OTHER PUBLICATIONS

"Region–Based Compilation: An Introduction and Motivation", Hank et al., Proc. of Micro–28, IEEE, pp. 158–168, Dec. 1995.

Hwe W.W. et al., "Intise Function Expansion for Compiling C Programs", ACM, pp. 246–255, 1989.

Wagner et al., "Accurate Static Estimators for Program Optimization", SIGPLAN, ACM, pp. 85–96, Jun. 1994.

Chang P.P. et al., "Profile–Guided Automatic Inline Expansion for C Programs", Soft. Practice and Experience, v. 22(5) pp. 349–369, May 1992.

ACM Principles and Practice of Programming Languages, 1994, pgs. 1–11, Brad Calder et al., "Reducing Indirect Function Call Overhead In C++ Programs".

ACM Sigplan notices, vol. 29, No. 4, Apr. 1994, pgs. 41–48, Jon Loeliger et al., "Developing An Interprocedural Optimizing Compiler".

Hewlett Packard HP 9000 Computers, Jul. 1996, pgs. 1–1 —4–1 and A–1, "HP PA–RISC Compiler Optimization Technology White Paper".

Hewlett Packard HP Confidential, Version 1.3, Nov. 15, 1991 Daryl Odnert, "An Overview of the Compiler Architecture for Advanced Optimization on PA–RISC".

Technical report TRCS 95–22 (University of California), Dec. 1995, pgs. 1–25, Gerald Aigner et al., "Eliminating Virtual Function Calls in C++ Programs".

*Primary Examiner*—Emanuel Todd Voeltz
*Assistant Examiner*—Kakali Chaki

[57] ABSTRACT

A compiler method converts an indirect call to a callee routine in a caller routine program listing, to an in-line listing of, or a direct call to, the callee routine in the caller routine. An indirect call is a call to a callee routine wherein the callee routine is not absolutely identified until run time of the program listing. The method includes the steps of: comparing plural prospective callee routines in the program listing with characteristics of an indirect caller site in the caller routine and eliminating prospective callee routines which evidence other than a match with those characteristics; employing call statistics associated with remaining prospective callee routines (and the caller routine) to eliminate further ones of the prospective callee routines to arrive at a set of one or more chosen prospective callee routines. The method concludes by in-lining at the indirect caller site at least one of the set of chosen prospective callee routines. As an alternative, a direct call can be inserted. At run time, the program listing is executed and, in the process of execution, the callee routine is absolutely identified. If the identified callee routine has already been in-lined (or there is a direct call present), it is executed and the program continues. If the identified callee routine is not present in the caller's code listing, via either an in-line listing or a direct call, an indirect call is executed to the identified callee routine.

20 Claims, 4 Drawing Sheets

COMPILER FOR REDUCING NUMBER OF INDIRECT CALLS IN AN EXECUTABLE CODE

FIELD OF THE INVENTION

This invention relates to a source code compiler which converts a source listing to an executable object code and, more particularly, to a source code compiler which reduces a number of indirect calls in the executable object code and replaces them with either in-line listings or direct calls.

BACKGROUND OF THE INVENTION

A compiler accomplishes a translation of a source code listing to a set of object files that are written in machine language. During the compilation action, code generation and optimization decisions are made, and the resultant coded output is then subjected to a linking action which primarily relocates code and data, resolves branch addresses and provides binding to run-time libraries.

Many modern programming languages support the concept of separate compilation, wherein a source code listing is broken up into separate modules that can be fed individually to a language translator for generation of the machine code. The use of source code modules during a compilation process enables substantial savings in required memory in the computer on which the compiler executes. In a co-pending application entitled "Compiler with Intermodular Procedure Optimization" (Attorney Docket 10961037-1) Ser. No. 08/795,986 filed Feb. 5, 1997, and assigned to the same Assignee as this Application, a method is described for improving the optimization of a source code listing which is compiled in a modular fashion. That method involves the derivation of a number of program-wide tables which enable inter-modular referencing to occur, even though individual modules are, in the main, processed individually during compilation. A principal use of the invention in the aforesaid patent application is to enable insertion of in-line code listings in place of direct call sites in the individual modules being optimized. A direct call is one wherein a routine is specifically noted in the routine by a name which enables a direct reference to the called routine, wherever it is stored.

Such code listings also include indirect calls. An indirect call is a reference to a subroutine (i.e., the callee) wherein the subroutine is not identified until program run time. Indirect calls are present in many of today's programming languages (e.g., C, Fortran, etc.) and also play a significant role in object-oriented programming languages like C++ and Java. Indirect calls, by their very nature require considerable processing and procedure delay time for their execution. If it were possible to identify, in advance, the callee of an indirect call, the code comprising the callee routine could be inserted into the caller's routine by in-lining or a direct call could be inserted to the identified code (a direct call requiring less processing than an indirect call).

As above indicated, in-lining replaces a call site in the caller routine with the callee routine's code. In-line substitution eliminates call overhead and tailors the call to the particular set of arguments passed at a given caller site. Nevertheless, since in the prior art the identification of a callee subject to an indirect call has not been known until run time, such indirect calls have remained in the compiled code and have resulted in increases in processing time.

In "Reducing Indirect Function Call Overhead in C++ Programs" Calder et al., ACM Principles of Programming Languages, Portland, Oreg., 1994, a technique is described for replacing an indirect call with a matching test, followed by a direct call. However it is assumed that prior to optimization, a profiling phase identifies a list of callee candidates for each indirect call site by observing program behavior on a test input. Such indirect call information is expensive to accumulate.

In other prior art, a compiler has been described which performs a series of passes over a database that contains information about all of the procedures in an application. A variety of analyses are performed to provide information as to which procedures are invoked by a direct call; which names refer to a same location (alias analysis); which pointers point to which locations (pointer tracking); which procedures use which scalars (scalar analysis); and which procedures should be in-lined at which call sites (in-line analysis); etc. The results of the analyses are then employed during the compile action to achieve application improvement. See "Engineering and Inter-Procedural Optimizing Compiler", Loeliger et al., Convex Computer Corporation, Richardson, Tex. (undated).

While the Loeliger et al. procedure performs many analyses, there is no indication of an attempt to identify, in advance, callee procedures that are subject to an indirect call.

Accordingly, it is an object of this invention to provide an improved compiler which attempts to identify a callee that is the subject of indirect call.

It is another object of this invention to provide an improved compiler which both identifies prospective callees of indirect calls and either in-lines the code of the identified callees into caller routine listings or inserts a direct call thereto.

SUMMARY OF THE INVENTION

A compiler method converts an indirect call to a callee routine in a caller routine program listing, to an in-line listing of, or a direct call to, the callee routine in the caller routine. An indirect call is a call to a callee routine wherein the callee routine is not absolutely identified until run time of the program listing. The method includes the steps of: comparing plural prospective callee routines in the program listing with characteristics of an indirect caller site in the caller routine and eliminating prospective callee routines which evidence other than a match with those characteristics; employing call statistics associated with remaining prospective callee routines (and the caller routine) to eliminate further ones of the prospective callee routines to arrive at a set of one or more chosen prospective callee routines. The method concludes by in-lining at the indirect caller site at least one of the set of chosen prospective callee routines. As an alternative, a direct call can be inserted. At run time, the program listing is executed and, in the process of execution, the callee routine is absolutely identified. If the identified callee routine has already been in-lined (or there is a direct call present), it is executed and the program continues. If the identified callee routine is not present in the caller's code listing, via either an in-line listing or a direct call, an indirect call is executed to the identified callee routine.

DETAILED DESCRIPTION OF THE INVENTION

Figure 1:
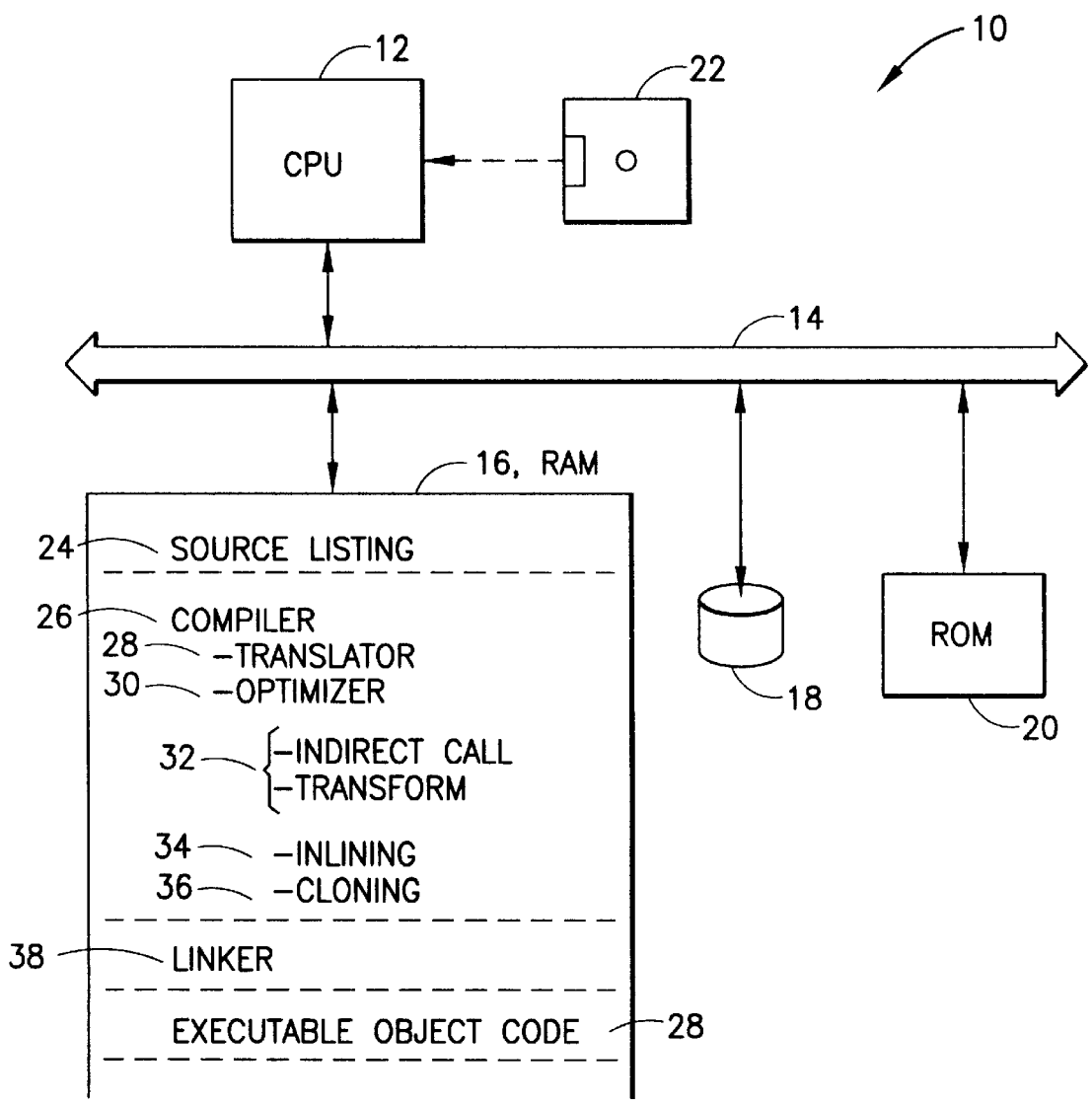
FIG. 1 is a block diagram of a system for carrying out of the invention hereof.

Referring to FIG. 1, a computer 10 includes a central processing unit (CPU) 12 which is coupled via a bus system 14 to a random access memory (RAM) 16, a disk drive 18 and a read-only memory (ROM) 20. A memory cartridge 22 is employed to insert a source listing into computer 10 and, further, may also be used to insert a compiler routine which incorporates the invention hereof.

RAM 16, as an example, provides temporary storage for a plurality code listings that are utilized during the operation of the invention. Source listing 24 comprises a set of files including a plurality of routines to be run in the course of execution of the program defined by source listing 24. A compiler 26 is employed to convert source listing 24 into machine executable object code 28 (that is further stored in RAM 16). Compiler 26 includes a translator module 28 which converts source listing 24 into intermediate representation (IR) object code. The IR object code is then fed to an optimizer module 30 which performs a number of optimizing actions to improve the performance of the overall program. Among the subroutines present in optimizer module 30 is an indirect call transform procedure 32, an in-lining procedure 34 and a cloning procedure 36. Lastly, a linker procedure 38 enables a linking of the optimized object code modules and outputs executable object code 28 (which is stored in RAM 16).

As above indicated, in-lining replaces a caller's call site with the actual code of the callee's routine. In-line substitution serves at least two purposes: it eliminates call overhead and tailors the call to the particular set of arguments passed at a given call site. However, unless the callee is known, in-lining of the callee's routine cannot be performed. If a direct call is present in a caller's code listing, in-lining is possible. An example of a direct call is illustrated immediately below as follows (written in C):

---
Direct Call

A( )
{ . . .
    B( ) ; . . .
}

---

Note that the direct call is present in caller routine A( ) and specifically names callee routine B( ). Thus, given a direct call to B( ), the listing for B( ) can be readily accessed and inserted bodily into the object code listing for caller routine A( ).

Shown below is an example of an indirect call:

---
Indirect Call

A( )
{ . . .
    (*X) ( ) . . .
}

--- where: X is dependent on the results of another routine.

Note that in the indirect call above, the callee routine (*X) is undefined as to name and the identity of X only becomes apparent at the conclusion of execution of a preceding routine.

As will be understood from the description below, indirect call transform 32 identifies one or more prospective callee routines which can be expected to be the subject of an indirect call. Once those routines are identified, they are preferably in-lined into the caller routine, with an indirect call still being retained in the code listing as a "last resort". As an alternative, a direct call may be inserted in lieu of the in-lining.

If the identified prospective callee routine(s) turn out not to match the actual callee routine that is output by a preceding routine, then the indirect call is executed, rather than the in-lined code (or direct call) from incorrectly identified routines.

Figure 2:
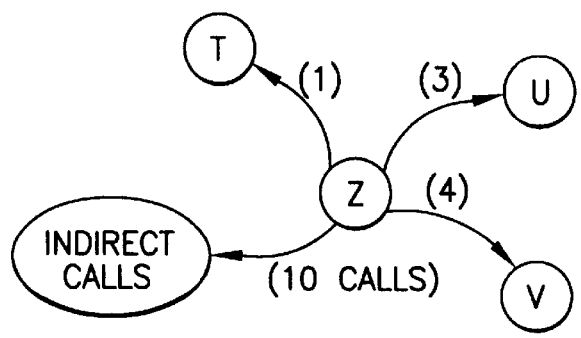
FIG. 2 is a schematic diagram of a global call graph utilized in the performance of the invention.
Figure 3:
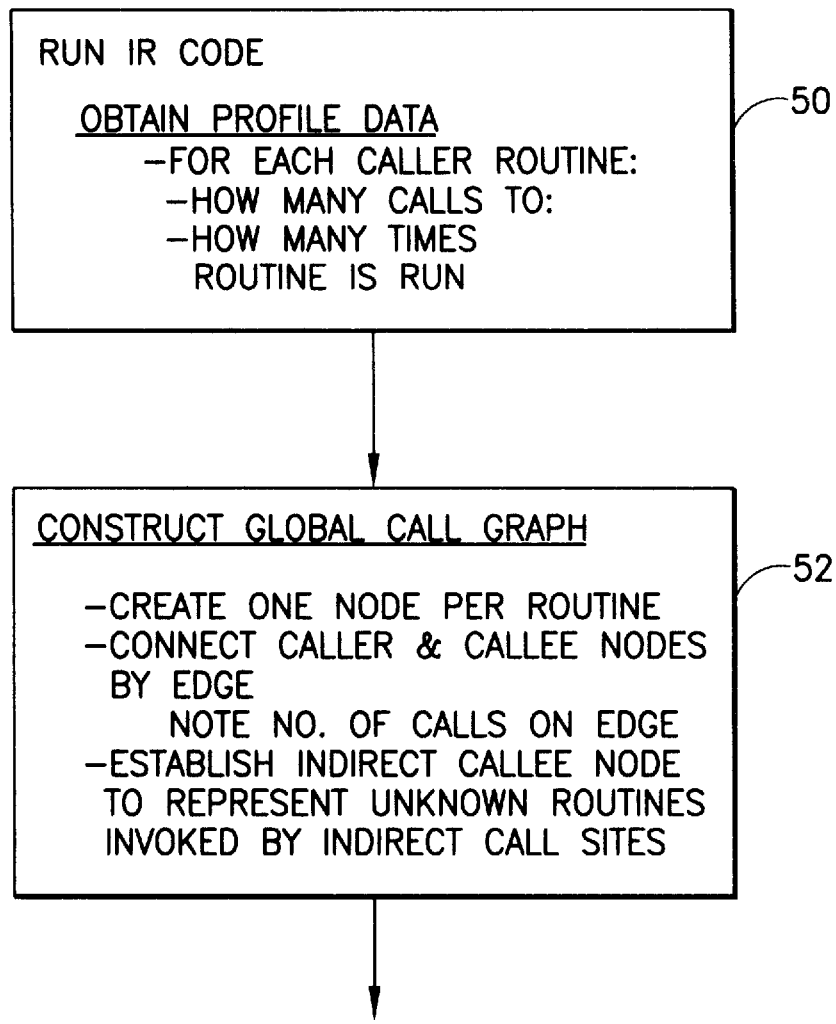
FIGS. 3–5 illustrate a logical flow diagram describing the operation of the invention.
Figure 4:
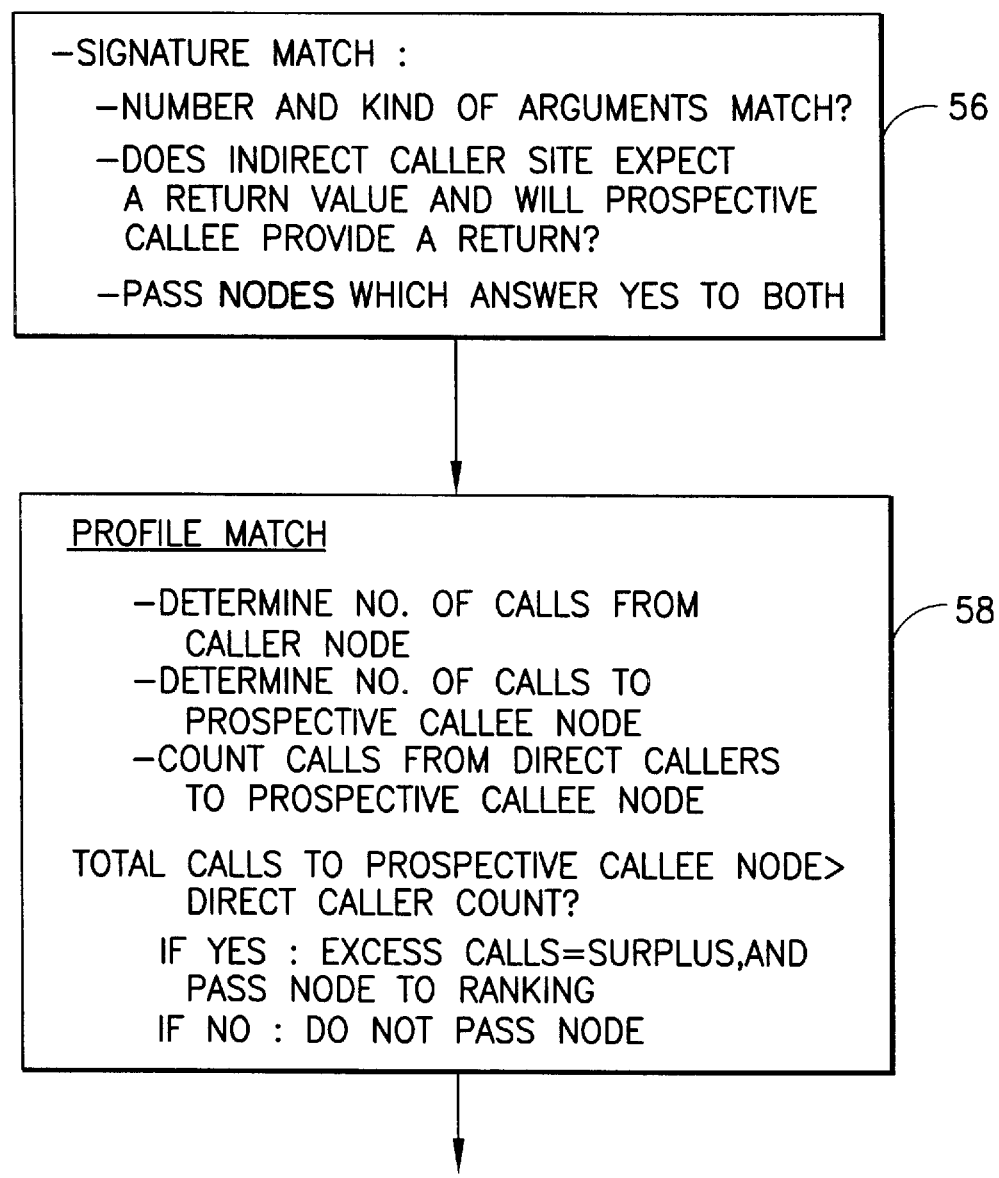

Turning to FIG. 3, the procedure of the invention will be described in conjunction with the flow diagram shown therein. Initially, a non-optimized form of the object code is executed to obtain "profile" data (box 50). During the profile run, for each call present in the code listing, the following are determined: the number of times the call was made; and how often each called routine is run. Subsequent to the profile data run, the IR object code is subjected to indirect call transform procedure 32 which initially constructs a global call graph (box 52). An example of the a global call graph is shown, schematically, in FIG. 2.

In FIG. 2, node Z represents a routine from which ten calls are output. Eight of those calls are direct calls, four to callee routine V; three to callee routine U and one to callee routine T. Each callee node is connected to the caller by an edge, which edge is then "decorated" with statistics indicating the number of calls represented by the edge (as determined during the profile run). Each edge is further associated with data obtained through the use of the profile run (box 50), such as the count of calls from a known caller to a known callee. Further, an indirect call node is established to represent the two indirect calls from caller node Z to presently unknown, indirectly called nodes. Note that if node Z executes a total of ten calls during its execution and that the total of calls to identified callee nodes is known (i.e., 4+3+1=8), then it is known there are two indirect calls from node Z to presently unidentified callees.

Referring back to box 52 in FIG. 3, the global call graph creates one node per routine and connects the caller and callee nodes by edges. The number of calls are noted on each edge and an indirect callee node is established to represent the unknown routines that are invoked by indirect calls from the caller node.

The procedure now moves to a determination of prospective callee nodes from indirect caller sites in the caller node. Each caller node is examined, in turn, to identify prospective callees and to eliminate those which are least likely to be called by the caller node. Two principal tests are employed to eliminate prospective callee nodes from further consideration: a "signature" match and a "profile" match.

The procedure commences by identifying a first caller node which includes one or more indirect calls. For each call site in the caller routine, each prospective callee routine (i.e., "node") in the program listing is sequentially accessed and is analyzed to determine if the number and kind of arguments it requires match the number and kind of arguments for the indirect call site, as derived from inspection of the IR code (box 50, FIG. 3). If there is no match, the prospective callee routine is skipped and a next prospective callee routine is accessed and the test repeated. If a match occurs, the indirect caller site is examined to determine if a return value it expects matches that which will be returned by the prospective callee routine. Here again, if there is no match, the prospective callee routine is skipped and a next prospective callee routine.

Once all prospective callee routines have been subjected to the signature match test, a much smaller subset of prospective callee routines remain. That smaller subset is then subjected to a profile match test which determines which of the remaining prospective callee routines evidences one or more indirect calls thereto. The profile match test (box 58) proceeds by determining the total number of calls (both direct and indirect) to the prospective callee node. Next, the number of direct calls to the prospective callee routine which come from identified caller nodes are retrieved from the global call graph.

It is then determined if the total number of calls to the prospective callee node exceed the direct caller count thereto. If yes, the excess calls are termed "surplus" and indicate a potential for the prospective callee routine being the subject of one or more indirect calls. The number of surplus calls is recorded and the node is passed to a ranking step (box 60). If there are no surplus calls, the prospective callee routine is rejected and a next prospective callee routine is subjected to the profile match test.

Figure 5:
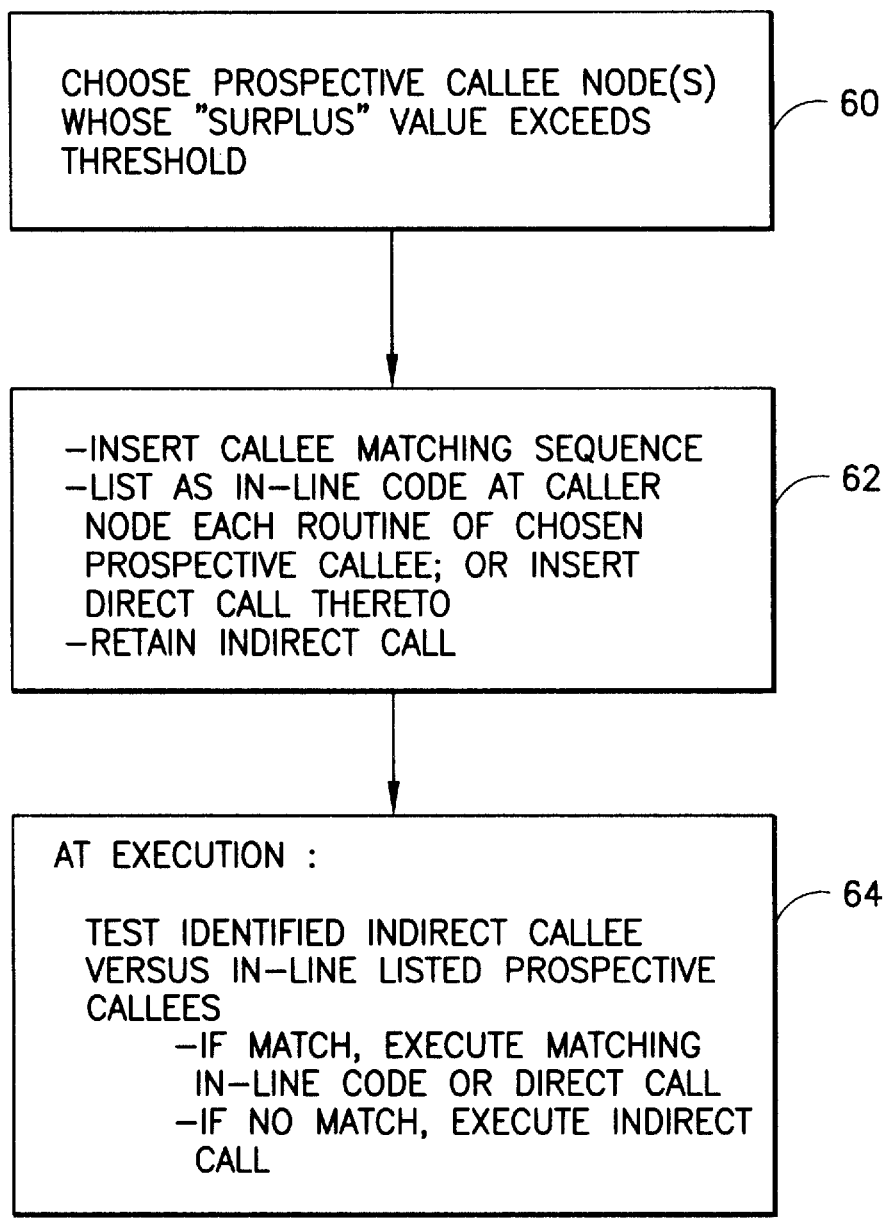

Turning to FIG. 5, at the end of the profile match test, one or more prospective callee nodes have been identified which have passed both the signature match and profile match tests. In general, these tests will greatly reduce the number of prospective callee nodes to a small number. The next step in the procedure is to rank the remaining prospective callee nodes in terms of their number of surplus calls. If the remaining number of prospective callee routines is greater than a predetermined number, a threshold comparison can be utilized to reduce the number of prospective callee routines by accepting only those which evidence a surplus of calls in excess of the threshold value. If the number of prospective callee nodes is few, the threshold can be set to 0.

Thereafter, the procedure moves to box 62 wherein each of the identified and ranked prospective callee nodes is accessed to determine and identify each callee routine. The optimizer then modifies the IR code immediately before the original indirect call to insert a matching test of the procedure to be called against the prospective callee nodes. Each of the identified and ranked prospective callee nodes is accessed to obtain their respective code listings and each of those routines is either "in-lined" in the caller routine at the call site or a direct call is inserted thereto. The decision whether to in-line code or insert a direct call is dependent upon the number of times the callee routine is executed. If the callee routine is executed often, it is preferably in-lined, and if infrequently executed, a direct call is used.

Importantly, the indirect call remains at the end of the in-lining action so that if none of the prospective callee nodes is the actual one chosen by a preceding processing action, then the indirect call can be implemented.

At execution of the compiled code, when the indirect call site is reached, the name of the now-identified indirect callee routine is compared to the names of the in-lined prospective callee routines to determine a match or no match state. If a match exists, the matching in-lined code therefor is executed and, at the end, a branch action occurs to skip any following non-executed code to a next step in the procedure after the indirect call site. If no match is determined, the indirect call is executed.

An implementation of the above invention has shown that a transformation designed to implement a guessing strategy such as described above, in fact leads to a substantial performance improvement in compiled code.

It should be understood that the foregoing description is only illustrative of the invention. Various alternatives and modifications can be devised by those skilled in the art without departing from the invention. Thus, while the above description has emphasized the method of the invention, a memory media (e.g., a diskette) with appropriate code can be caused to operate a computer to carry out the invention. Accordingly, the present invention is intended to embrace all such alternatives, modifications and variances which fall within the scope of the appended claims.

We claim:

1. A compiler method for converting, in a program listing, an indirect call from a caller routine to a prospective callee routine to an in-line listing of said prospective callee routine in said caller routine or to a direct call to said prospective callee routine, an indirect call defined as a call to a callee routine wherein the callee routine is not identified until run time of said program, said compiler method comprising the steps of:

a) comparing characteristics of plural prospective callee routines in said program listing with characteristics of an indirect caller site in said caller routine and eliminating prospective callee routines which evidence other than a match therebetween;

b) employing call statistics associated with prospective callee routines and said caller routine, to eliminate ones of said prospective callee routines which have non-matching call statistics;

c) employing the results of steps a) and b), determining a chosen set of one or more prospective callee routines; and d) inserting at least one of: (i) a code listing for at least one of said chosen set of one or more prospective callee routines, or (ii) a direct call for at least one of said chosen set of one or more prospective callee routines, at said indirect caller site.

2. The compiler method as recited in claim 1, wherein said comparing step a) determines a presence or absence of a signature match between each prospective callee routine and said indirect caller site, a signature match comprising at least a comparison of number and kind of parameters passed by said indirect caller site, to a number and kind of parameters utilized by said prospective callee routine, an absence of a signature match eliminating a prospective callee routine from further consideration.

3. The compiler method as recited in claim 2, wherein said comparing step a) also determines if said indirect caller site expects to receive a return value from an indirect callee routine and said prospective callee routine provides a return value to a caller site and, if not, eliminating said prospective callee routine from further consideration.

4. The compiler method as recited in claim 1, wherein said employing step b) determines a number of indirect calls to each prospective callee routine under consideration and eliminates any prospective callee routine which has no indirect calls.

5. The compiler method as recited in claim 4, wherein said employing step b) ranks prospective callee routines by a number of indirect calls determined for each thereof.

6. The compiler method as recited in claim 1, wherein said inserting step d) inserts each of said chosen set of one or more prospective callee routines determined in step b) at said indirect caller site by in-lining each in said caller routine.

7. The compiler method as recited in claim 1, further comprising the added step of:

e) retaining at said indirect caller site an indirect call, to be implemented in an event none of said chosen set of one or more prospective callee routines matches an indirect callee determined at run time.

8. The compiler method as recited in claim 7, further comprising the steps of:

f) executing said program listing and, upon identification of a callee routine that is a subject of an indirect call in said program listing, comparing a name of the callee routine so identified with names of said chosen set of one or more prospective callee routines, and executing one thereof upon determining a match therebetween.

9. The compiler method as recited in claim 8 where, if no match is found between said name of the callee routine identified in step f) with names of said chosen set of one or more prospective callee routines, executing said indirect call.

10. The compiler method as recited in claim 1, wherein said inserting step d) employs a determination of a number of times a code listing is executed to decide whether to insert a code listing of a prospective callee routine, or to insert a direct call to a prospective callee routine.

11. A memory media for controlling a computer to execute a compiler method which converts, in a program listing, an indirect call from a caller routine to a prospective callee routine to an in-line listing of said prospective callee routine in said caller routine or to a direct call to said prospective callee routine, an indirect call defined as a call to a callee routine wherein the callee routine is not identified until run time of said program, said memory media comprising:

a) means for controlling said computer to compare characteristics of plural prospective callee routines in said program listing with characteristics of an indirect caller site in said caller routine and to eliminate prospective callee routines which evidence other than a match therebetween;

b) means for controlling said computer to employ call statistics associated with prospective callee routines and said caller routine, to eliminate ones of said prospective callee routines which have non-matching call statistics;

c) means for controlling said computer to employ the results of steps a) and b), in determining a chosen set of one or more prospective callee routines; and d) means for controlling said computer to insert at least one of: (i) a code listing for at least one of said chosen set of one or more prospective callee routines, or (ii) a direct call for at least one of said chosen set of one or more prospective callee routines, at said indirect caller site.

12. The memory media as recited in claim 11, wherein said means a) determines a presence or absence of a signature match between each prospective callee routine and said indirect caller site, a signature match comprising at least a comparison of number and kind of parameters passed by said indirect caller site, to a number and kind of parameters utilized by said prospective callee routine, an absence of a signature match eliminating a prospective callee routine from further consideration.

13. The memory media as recited in claim 11, wherein said means a) further determines if said indirect caller site expects to receive a return value from an indirect callee routine and said prospective callee routine provides a return value to a caller site and, if not, eliminates said prospective callee routine from further consideration.

14. The memory media as recited in claim 11, wherein said means b) determines a number of indirect calls to each prospective callee routine under consideration and eliminates any prospective callee routine which has no indirect calls.

15. The memory media as recited in claim 14, wherein said means b) ranks prospective callee routines by a number of indirect calls determined for each thereof.

16. The memory media as recited in claim 11, wherein said means d) inserts each of said chosen set of one or more prospective callee routines determined by means b) at said indirect caller site by in-lining each in said caller routine.

17. The memory media as recited in claim 11, further comprising:

e) means for controlling said computer to retain at said indirect caller site an indirect call, to be implemented in an event none of said chosen set of one or more prospective callee routines matches an indirect callee determined at run time.

18. The memory media as recited in claim 17, further comprising:

f) means for controlling said computer to execute said program listing and, upon identification of a callee routine that is a subject of an indirect call in said program listing, comparing a name of the callee routine so identified with names of said chosen set of one or more prospective callee routines, to execute one thereof upon determining a match therebetween.

19. The memory media as recited in claim 18 where, if no match is found between said name of the callee routine identified by means f) with names of said chosen set of one or more prospective callee routines, means f) causes execution of said indirect call.

20. The memory media as recited in claim 11, wherein said means d) employs a determination of a number of times a code listing is executed to decide whether to insert a code listing of a prospective callee routine, or to insert a direct call to a prospective callee routine.

* * * * *